UNITED STATES PATENT OFFICE.

JOKICHI TAKAMINE, OF NEW YORK, N. Y.

PROCESS OF PREPARING EXTRACTS OF THE SUPRARENAL GLANDS.

SPECIFICATION forming part of Letters Patent No. 730,198, dated June 2, 1903.

Original application filed November 5, 1900, Serial No. 35,546. Divided and this application filed January 8, 1901. Serial No. 42,550. (No specimens.)

*To all whom it may concern:*

Be it known that I, JOKICHI TAKAMINE, a subject of the Emperor of Japan, residing in the city of New York, county and State of New York, have invented certain new and useful Improvements in Processes of Preparing an Extract of the Suprarenal Glands; and I do hereby declare the following to be a full, clear, and exact description of the invention, such as will enable others skilled in the art to which it appertains to make and use the same.

This invention relates to an improved process of preparing an extract of the suprarenal glands.

In my application No. 35,546, filed November 5, 1900, I have described a process for isolating and purifying the extract or active principle of said glands.

My present invention relates to a simplified and cheaper process for producing an extract which is not so highly purified as the product of the process therein described, but much purer than the ordinary aqueous extract, and is suitable for some purposes.

In carrying out my invention the clean suprarenal capsules from animals—such as cattle, sheep, &c.—are disintegrated by suitable means. I then make a fluid extract of the capsules or glands by the use of any suitable extractive solvent for the active principle—such, for instance, as water. This I accomplish by mixing with the disintegrated capsules or glands about the same weight of water and steeping at a temperature of about 60° to 75° centigrade for the period of about five to ten hours in a suitable vessel, preferably avoiding contact with atmospheric air, which can be to a great extent accomplished by a film of fat floating on top of the liquid or may be done by passing a slow current of hydrogen or carbonic-acid gas into the top part of the vessel. The object of this is to prevent the oxidation of the extract. At the latter part of the steeping the temperature of the mixture may be raised from 85° to 100° centigrade. The mass is now strained, and the residue is pressed to squeeze out as much liquid as possible. The residue thus pressed out is steeped again with the least amount of water to cover the mass for several hours at the same temperature as above. The two extracts thus obtained are mixed, and the mixture is cooled rapidly and the solidified fat removed. The liquid is now evaporated at a low temperature, preferably in a vacuum-pan, admitting, if necessary, a small quantity of hydrogen or carbonic acid to replace air and to prevent oxidation. The liquid is evaporated until it becomes one-fifth to one-seventh of the original volume. To this concentrated solution two to three times its own volume of alcohol is added, so that the mixture will contain about sixty per cent. of alcohol by volume. This addition of alcohol will precipitate non-active bodies, such as albuminoids, phosphates, and other mineral salts. It is then filtered and the filtrate distilled under vacuum to separate the alcohol, which is condensed and recovered in a suitable manner. This concentration is carried as far as may be desirable, and the product may be sold in any desired degree of concentration, or by carrying the concentration sufficiently far the product may be reduced to a solid state and may be sold in that form.

Having thus described my invention, the following is what I claim as new therein and desire to secure by Letters Patent:

1. The process of preparing an extract of suprarenal glands, which consists in making a fluid extract of the glands, adding to said extract a precipitant for non-active albuminoid and mineral matters, and removing the precipitate thus formed.

2. The process of preparing an extract of the suprarenal glands, which consists in making an aqueous extract of the glands, adding to said extract a precipitant for non-active albuminoid and mineral matters and removing the precipitate so formed.

3. The process of preparing an extract of the suprarenal glands, which consists in making an aqueous extract of the glands, concentrating it to suitable strength, adding alcohol to precipitate non-active albuminoid and mineral matters, and removing the precipitate, substantially as set forth.

4. The process of preparing an extract of the suprarenal glands, which consists in making an aqueous extract of the glands, concentrating it to suitable strength, adding alcohol to precipitate non-active albuminoid and mineral matters, filtering, and concentrating the filtrate by evaporation, substantially as set forth.

5. The process of preparing an extract of the suprarenal glands, which consists in disintegrating the glands, steeping the disintegrated glands in water while preserving the same from oxidation, concentrating the extract so produced, adding alcohol to the concentrated extract to precipitate non-active bodies, removing the precipitate so formed and concentrating the residue.

JOKICHI TAKAMINE.

Witnesses:
   ARTHUR P. KNIGHT,
   J. GREEN.